United States Patent Office 2,844,441
Patented July 22, 1958

2,844,441

PROCESS OF PURIFYING LIQUID SILICON HALIDE

Remo Angelo Pellin, Wilmington, Del., assignor to E. I. du Pont de Nemours and Company, Wilmington, Del., a corporation of Delaware No Drawing. Application November 26, 1954
Serial No. 471,497

7 Claims. (Cl. 23—205)

This invention relates to the preparation of elemental, hyperpure silicon, and more particularly to novel methods for removing minor impurities from silicon halides, especially silicon chlorides, to obtain such pure silicon.

As is already known, silicon can be prepared in relatively pure state by the vapor phase reduction of redistilled silicon tetrachloride with commercial grade pure zinc. The silicon product will, however, contain traces of metal contaminants and up to as much as .03% of carbon. For the most sensitive electronic uses, silicon of higher purity is required because the presence of even trace amounts of impurities proves detrimental for the most exacting semiconductor requirements, especially in newer electronics applications, such as transistors.

Commercial high-purity silicon tetrachloride employed in prior silicon preparation is obtained by chlorinating the purest commercially available electro-furnace silicon. Because electro-furnace silicon is obtained by the reduction of silica in the presence of carbon or graphite, this source always contains appreciable, undesired amounts of carbon and other impurities. As these impurities readily chlorinate along with the silicon and are difficult or impossible to separate from it by distillation or other known means, commercial high-purity silicon tetrachloride retains objectionable minor or trace amounts of chloro- or oxychloro or other complex chloro-compounds of such elements as carbon, boron, iron, copper, tin, aluminum, titanium, chromium, nickel, vanadium, phosphorus, and others, as well as oxychloro-compounds of silicon. Hence, the impurity content of commercial silicon tetrachloride is not satisfactorily low for preparing therefrom transistor-grade pure elemental silicon and with the constancy required for regular commercial production. This is particularly true because most of the impurities mentioned influence the semi-conductor qualities of the silicon when present in the product even in trace amounts.

It is among the objects of this invention to overcome these and other disadvantages characterizing prior silicon preparation and to provide in particular an improved process for producing elemental silicon by the vapor phase reduction of pure silicon tetrachloride with pure elemental zinc vapor. A further object is to provide a novel process for preparing hyperpure elemental silicon of improved electrical semiconductor quality, and to provide an improved process for purifying silicon halides, especially silicon tetrachloride. Other objects and advantages of the invention will be evident from the ensuing description.

These objects are accomplished by this invention which comprises extracting impurities from a silicon halide such as silicon tetrachloride, by intimately contacting said halide and an inorganic acid selected from the group sulfuric acid and phosphoric acid, separating the resulting halide product from the treating acid containing the extracted impurities, passing a vaporized stream of the resulting purified silicon halide and a stream of vaporized high purity elemental zinc into a reaction zone for vapor phase reduction, maintaining the temperature of said zone above the boiling point of the elemental zinc and below the melting point of the silicon product, removing by-products and unreacted reactants in the vapor state from said zone and recovering the crystals of elemental silicon deposited therein.

In a more specific embodiment, the invention comprises subjecting silicon tetrachloride to liquid-liquid extraction by treatment with concentrated sulfuric acid, separating the extracted silicon tetrachloride product from the sulfuric acid containing the extracted impurities, charging a vaporized, heated stream of said product and a heated stream of vaporized elemental high-purity zinc into a vapor phase reduction reactor for intimate mixing and reaction within said reactor, maintaining a slight stoichiometric excess of silicon tetrachloride and a temperature ranging from about 907° C. to 1100° C. in said reactor, removing from the latter in the vapor state reaction by-products and unreacted reactants, and recovering the hyperpure elemental silicon which forms and deposits therein.

In one practical and preferred adaptation of the invention, a silicon halide such as commercial or technical grade or purer silicon tetrachloride is charged under inert gas pressure into the bottom of a suitable column of concentrated sulfuric acid maintained at about ordinary room temperature in an enclosed tower composed of glass or other suitable inert material of construction. The charge is allowed to pass upwardly through said column and is removed from the top thereof by continuous decantation, as highly purified silicon tetrachloride. A stream of this purified silicon tetrachloride is then vaporized and heated to about 900° C. in a suitable heating vessel such as in silica, all-welded equipment, and is then passed into an associated vapor phase reduction zone or reactor, which is maintained at about 950° C. and also is preferably fabricated of fused silica. Concurrently, a heated stream of vaporized elemental zinc of high purity is charged into said reactor, the streams of reactants being immediately commingled and intimately mixed therein upon their entrance into said reactor, the reactants feed rates being regulated close to stoichiometric equivalency with a slight excess of silicon tetrachloride being maintained. The silicon product is deposited in the reaction zone in the form of elemental silicon of hyperpurity. The unreacted reactants and by-product zinc chloride are removed from the reactor as vapor and the reaction is preferably continued until the reactor becomes almost completely filled with elemental silicon.

To a clearer understanding of the invention, the following specific examples are given. These are only illustrative and are not to be taken as limiting the scope of my invention.

*Example 1*

Commercial, previously distilled silicon tetrachloride containing minor amounts of chloro-, oxychloro-, and complex chloro-compounds of carbon, boron, iron, copper, aluminum, tin, titanium, chromium, nickel, vanadium, and phosphorous impurities was used as the raw material source for the silicon. A heated stream of this tetrachloride was continuously vaporized in all-welded fused silica equipment in an associated preheating coil and a pyrolyzing zone comprising a bed of fused silica rings maintained at a temperature of about 1000° C., the flow rate used being such that the silicon tetrachloride vapor retention within the pyrolyzing zone was about 2 to 3 seconds. The vapor emerging from the pryolyzing bed or zone was continuously condensed and fractionated in associated equipment, the silicon tetrachloride distillate being highly purified, particularly with respect to carbon and oxy-silicon containing contaminants. This distillate was then continuously forced by pressure of an inert gas, such as argon, from a storage vessel, at a rate of about 35–50 cubic centimeters per minute, through a tubular glass inlet into the bottom of the first of four series connected glass treating towers or columns, about 2 inches in diameter, each packed with quartz rings and containing one liter per column of liquid sulfuric acid of about 95–98% strength, by weight, of reagent quality, maintained at about room temperature. The total combined height of the columns was equivalent to about 60 inches of acid. The silicon tetrachloride, due to its lower specific gravity, flowed upwardly through each column in direct contact with the $H_2SO_4$ and was removed by decantation from the top of each successive treating column through a glass decantation tube and fed into the bottom of the next column in series. The silicon tetrachloride removed from the last column was in highly purified state, especially with respect to the absence of copper, iron, boron, titanium, and aluminum contaminants. The highly purified silicon tetrachloride, at a rate of about 33 cubic centimeters per minute, was revaporized and reheated to about 900° C. in all-welded fused silica equipment, and was then passed into a vapor phase reduction reactor wherein it was immediately mixed with a heated stream of elemental zinc of high purity. This reactor consisted of a horizontally positioned fused silica cylinder about 8 inches in diameter and about 6 feet long, and its reduction zone was maintained by external heating at a temperature of about 1000° C. The two reactants were conducted into the reactor in fused silica tubing, horizontally positioned and passing through the entrance end plate wall of the reactor, closely adjacent to and parallel to each other, so that immediate mixing of the reactant streams took place upon their entrance into the reactor. The zinc vapor feed, of about 99.999% purity, was fed into the reactor at about 34 grams per minute, being vaporized in an associated boiler composed of fused silica. While continuously charging the zinc and silicon tetrachloride reactants to said reactor, a 5 to 10 percent excess of silicon tetrachloride was maintained in the reduction zone. The resulting hyperpure silicon product obtained was continuously deposited within the reactor, reaction by-product zinc chloride and unreacted zinc and unreacted silicon being removed in the vapor state from the exit end of the reactor over a period of about 40 hours. During this period the reaction space became almost filled with deposited high-purity elemental silicon. The flow of reactants was discontinued and the reactor cooled to allow recovery of the product. A yield of about 50%, based on the silicon tetrachloride fed, not including that fed in stoichiometric excess of the zinc, was obtained.

*Example II*

Commercial silicon tetrachloride containing minor amounts of impurities including .3 p. p. m. Cu, .5 p. p. m. Fe, and .82 p. p. m. B, was fed continuously as a liquid into a glass head tank of a single unpacked extraction tower of the type used in Example I. The silicon tetrachloride was continuously charged to said tower at a rate of about 30–40 cubic centimeters per minute from said head tank under argon pressure and through an entrance tube leading to the bottom of the column, from whence it passed upwardly through the column in intimate contact with the sulfuric acid, which was maintained at a predetermined level below the $H_2SO_4$ valve-controlled inlet and a silicon tetrachloride overflow level or outlet provided in the tower. Replacement of sulfuric acid which had become high in impurities extracted from the silicon tetrachloride was effected intermittently through said inlet, which communicated with a suitable $H_2SO_4$ source, and after a volume of silicon tetrachloride equivalent to about 300 times the volume of sulfuric acid in the column had been charged through the system. The column was operated at normal room temperature. The effluent silicon tetrachloride was continuously vaporized at the same rate and preheated in all-welded fused silica equipment into an associated pyrolyzing zone comprised of an enclosed silica tower containing fused silica chips. The silicon tetrachloride was preheated to about 1000° C., and the pyrolyzing zone was also maintained at about that temperature, the retention time of the silicon tetrachloride within the zone being about 5 seconds. The vapor emerging therefrom was continuously condensed and subjected to fractionation distillation, the silicon tetrachloride distillate being highly purified silicon tetrachloride, particularly with respect to carbon, titanium, chromium, vanadium, aluminum, and oxy-silicon containing contaminants, which were not detected, and also with respect to copper, iron and boron which were very low, the analyses being <0.1 p. p. m. Cu, <0.1 p. p. m. Fe, and .06 p. p. m. B. The highly purified silicon tetrachloride from this purification step was revaporized and reacted with high-purity zinc vapor in the same manner as described in Example I. The hyperpure silicon product obtained was satisfactory for use in the manufacture of transistors.

*Example III*

Fifty parts by volume of liquid high-purity silicon tetrachloride containing minor amounts of various impurities, including boron, copper and iron, was introduced into twenty-five parts by volume of concentrated (about 95–98% by weight) sulfuric acid, contained in a separatory funnel. The mixture was shaken for one minute, and the sulfuric acid removed by gravity separation. Due to some hydrolysis of the silicon tetrachloride by uncombined water in the sulfuric acid, a small amount of fine white silica gel was visible in the sulfuric acid phase and particularly at the interface between the two liquids, after shaking. The silicon tetrachloride was analyzed for copper with the following results:

Parts per million Cu, before extraction _____ .2
Parts per million Cu, after extraction _____ .02

The $SiCl_4$ thus obtained was revaporized and reacted with pure vaporized zinc in the manner described in Example II to obtain transistor quality hyperpure silicon.

*Example IV*

A single glass column of the type used in Example I, packed with quartz rings, was employed to extract the impurities from a commercial-grade silicon tetrachloride. This column was about 2 feet in height and about one inch in diameter and held about 150 ml. of concentrated (about 95–98% by weight) reagent grade sulfuric acid which was allowed to continuously flow by gravity from an associated head tank through a valve-controlled tubular inlet into the column to a point below the level of the silicon tetrachloride and sulfuric acid interface, with means being provided in the bottom of the column for the continuous removal of contaminant-containing $H_2SO_4$ from the extraction. Simultaneously, silicon tetrachloride from an associated supply vessel was forced, by argon pressure, through a glass charging tube into the bottom of the sulfuric acid column and allowed to flow upwardly through the packed acid column and ultimately decanted at a rate of about 30 cc. per minute from the top of the column at a predetermined level via and through a glass tube to an associated receiver. The sulfuric acid was simultaneously passed down through the column at about one-half that rate on a volumetric basis. This extraction was performed three times in succession on the same sample of silicon tetrachloride, with the following analytical results, indicating the high purity of the silicon tetrachloride product:

|  | p. p. m. Fe | p. p. m. Cu |
|---|---|---|
| Original silicon tetrachloride | .40 | .20 |
| 1 pass through column | .17 | .04 |
| 3 passes through column | <.01 | .004 |

A stream of the highly purified silicon tetrachloride prepared as just described, using three columns in series, was vaporized and heated to about 950° C., and passed into a vapor phase reduction reactor as described in Example I, along with a stream of zinc vapor of about 99.999% purity and the two streams were immediately and continuously mixed within the reactor which was maintained at about 950° C. by external heating. Using the same rates of flow of reactants as in Example I, the reactor was almost filled with high-purity silicon in about forty hours of continuous operation. The zinc chloride byproduct and the unreacted reactants were continuously removed from the reactor in the vapor state. The very high-purity elemental silicon removed from the reactor after cooling was of improved semiconductor quality compared to that produced from the same zinc and the same commercially pure silicon tetrachloride which has not been subjected to the purification by $H_2SO_4$ extraction of this invention and was found suitable for use in transistor manufacture.

Example V

A sample of commercial-grade silicon tetrachloride was extracted by shaking in a separating funnel with successive volumes of sulfuric acid of 85 percent strength, as described in Example III. While considerable precipitation of silica took place, the impurity concentration was reduced as indicated by the following analyses:

|  | Fe, p. p. m. | Cu, p. p. m. |
|---|---|---|
| Commercial $SiCl_4$ | .78 | .55 |
| One extraction | .06 | .09 |
| Three extractions | .03 | .02 |

The pure $SiCl_4$ product thus obtained was revaporized and reacted with pure, vaporized zinc in accordance with the procedures described in Example I to obtain a high-grade, pure transistor useful form of silicon product.

Example VI

A sample of commercial-grade silicon tetrachloride was extracted by shaking in a separatory funnel with an equal volume of phosphoric acid of 85 percent strength and C. P. reagent grade quality, by following the procedures of Example III. The impurity concentration was reduced as indicated by the following analyses:

|  | B, p. p. m. | Cu, p. p. m. | Fe, p. p. m. |
|---|---|---|---|
| Commercial $SiCl_4$ | 0.74 | 0.37 | 0.18 |
| One extraction | 0.08 | none | none |

A stream of the highly purified silicon tetrachloride, prepared as just described, was vaporized and heated to about 950° C. and passed into a vapor phase reactor of the type described in Example I along with a stream of zinc vapor of about 99.999% purity. The two streams were immediately and continuously mixed within said reactor which was maintained at about 950° C. by external heating. Using the same rates of flow of reactants referred to in Example I, the reactor was almost filled with high-purity silicon in about forty hours of continuous operation. The very high-purity elemental silicon removed from the reactor after cooling was of improved semiconductor transistor grade quality, compared to that produced from the same zinc and the same grade of silicon tetrachloride which had not been previously subjected to purification by extraction with phosphoric acid.

Example VII

A one liter sample of commercial silicon tetrachloride containing minor amounts of impurities including .29 p. p. m. of boron was vaporized and bubbled upwardly through a 15 inch glass column containing 200 cc. of concentrated C. P. $H_2SO_4$, heated to 58° C. The silicon tetrachloride vapor passed through the column and was condensed at a rate of 10 cc. per minute. $SiO_2$ formation was higher than with liquid samples. The silicon tetrachloride that evolved from the column was passed into a condenser and collected as liquid. The second and last 200 cc. portions of condensed product were analyzed as follows:

|  | B, p. p. m. | Fe, p. p. m. | Ti, p. p. m. |
|---|---|---|---|
| Initial sample | .29 | .53 | 2.0 |
| 2nd 200 cc | .02 |  |  |
| 3rd 200 cc |  | .07 | .5 |
| 5th 200 cc | .00 |  |  |

As indicated above, the extraction of silicon halides in both liquid and vaporous state is contemplated, with the silicon halide being passed in vapor form through a column of liquid sulfuric acid. In the latter instance the sulfuric acid temperature is maintained below the boiling point, preferably below about 200° C., so that none will be vaporized into the silicon halide vapor.

The mechanism of the removal of objectionable trace impurities from silicon halides by the employment of sulfuric acid or phosphoric acid in accordance with this invention is not completely understood at present. In the case of sulfuric acid, it is more polar than the silicon halides and is therefore more readily subject to complex formation than such halides. Impurities can be removed from the silicon halides by at least two possible extraction mechanisms: preferential solubility and complex formation. Furthermore, initially, silicon halides, as for example silicon tetrachloride, react with any uncombined water in the sulfuric acid to produce a small amount of gelatinous $SiO_2$ and some removal of impurities on the initially formed silica gel may take place. Preferential solubility and complex formation appear to be completely effective as the purification continues after all uncombined water has been removed from the sulfuric acid by precipitation as silica gel, and after that precipitated gel has been removed from the acid extraction zone. The extraction of silicon halide with sulfuric acid can be carried out by means of the usual varied methods of liquid-liquid extraction, wherein liquids of different specific gravities are mutually contacted and separated by means of the difference in specific gravity. The liquid-liquid extraction can be done by mixing the two liquids in a separatory funnel, shaking for a short time, and separating one from the other by decantation. Continuous methods of liquid-liquid extraction can also be readily applied, as illustrated in the examples. Passing the liquid to be purified upwardly through the extracting liquid is usually practiced, particularly in the case of extraction of impurities from silicon tetrachloride with sulfuric acid. If a liquid heavier than sulfuric acid is to be extracted, as for example silicon tetrabromide, the silicon bromide can be allowed to pass downwardly through a column of the acid. Although usually somewhat less efficient, sulfuric acid can be allowed to pass downwardly through a column of silicon tetrachloride, if desired. The temperature at which the extraction of the silicon halide is carried out is variable, depending upon the temperature at which the silicon halides exist as liquids. In the case of silicon chlorides, in particular the tetrachloride and the hexachloride, ordinary room temperatures are preferred, although higher or lower temperature can be used, if desired. In the case of the bromides, temperatures of about 95–150° C. are preferred, while in the instance of silicon tetraiodide purification, recourse to temperatures within the range of from 120° C. to about 150° C. or higher can be had. Glass, silica, glass-coated steel, tantalum, or other non-corrodible, inert types of material can be used for fabrication of the extraction apparatus used in the process.

Sulfuric acid close to 100 percent strength comprises the preferred form of extraction acid in the invention. Reagent grade concentrated sulfuric acid usually of about 95–98 percent strength is within the preferred range. As silicon halides are passed through the acid, the uncombined water is reacted to form silica gel, thus using up silicon halide. Therefore, while lower concentrations of sulfuric acid can be utilized, acid which is within the range of about 80 to 100 percent strength, and not fuming, is satisfactory.

The amount of extracting acid used, in relation to the amount of silicon halide under treatment, can vary widely, depending on the amount and nature of impurities present in the halide, the desired final purity, the temperature of operation, etc. For economic reasons, recourse is had to the smallest volume of acid, per volume of halide, and the shortest contact time with the acid which will result in the desired purification. If desired, as low as one volume of acid for each 300 volumes of silicon tetrachloride can be used. Obviously, higher ratios are also satisfactorily utilizable. A finite time of contact of the acid with the silicon halide can be used. Such time can range from about 5 seconds to about 5 minutes, or longer.

The pyrolyzing zone or bed is maintained at a temperature above 600° C. However, best results are obtained at a temperature above that to which the silicon halide is to be subjected in the silicon tetrahalide reduction reactor. Preferably, and for complete conversion of the contaminating compounds to species removable from silicon tetrachloride, temperatures within the range of 975° C. to 1200° C. are used. Thet silicon tetrachloride entering the pyrolyzing zone is preferably preheated to a temperature close to that at which the pyrolyzing zone is maintained during operation. The pyrolyzing zone comprises an enclosed associated area of heat transfer surface such as an unpacked tube of inert, non-contaminating, and refractive material, as for example, silica, or a pervious bed of packing material of similar material, enclosed in a tube, chamber or tower. Silica is particularly suitable as the tube or packing surface material, as it can be obtained in a state of fairly high purity, and can be suitably fabricated and welded to form a continuous apparatus. Packing material such as rings, chips or fragments of 2–16 mesh or larger are suitable. In instances where silica is used as the pyrolyzing surface for silicon tetrachloride, some decomposition of the silica may occur, particularly at the higher temperature ranges, due to the chlorination by the silicon tetrachloride. The contact time of the silicon halide within the heated pyrolyzing zone is dependent upon the types and amounts of contaminating compounds, as well as the temperature at which the zone is maintained. Sufficient contact time is provided to allow for pyrosynthesis reactions to take place to obtain compounds sufficiently changed in molecular weight for easy separation from the silicon tetrachloride. Usually about 1–5 seconds at the temperature indicated is sufficient time; however, if desired, from one-half a second to a minute and longer can be utilized.

The temperature of the reduction reaction zone is maintained above the boiling point of the elemental zinc reductant and below the melting point of the elemental silicon product. The temperature of the silicon halide and the zinc reactant vapors entering the reactor are preferably preheated to a temperature close to that prevailing and being maintained within the reduction reaction zone during operation. Usually, reduction reaction zone temperatures within a range of 107–1100° C. are employed.

The reduction reaction can be carried out using up to fifty percent by weight excess or deficiency of silicon tetrachloride over zinc, based on the equation:

$$2Zn + SiCl_4 = 2ZnCl_4 + Si$$

although, preferably, from about five to ten percent excess is used. In order to further insure a hyperpure product, the flow of silicon tetrachloride is maintained through the reaction zone for a short period of time after the flow of zinc vapor through the reaction zone has been discontinued at the end of the continuous reaction period.

As already indicated, the invention is applicable to the silicon halides generally, including silicon tetrachloride, di-silicon hexachloride, silicon tetrabromide, di-silicon hexabromide, silicon tetraiodide, and the like.

If desired, an inert carrier gas, such as nitrogen or other gas selected from the eighth group of the periodic table, can be used to assist in conveying the silicon halide vapor or vaporized zinc through the pyrolyzing or reduction reaction equipment, and to control reaction conditions.

The pressure at which the silicon halide is maintained over the silica or other pyrolyzing surface is not known to be critical. While pressures very close to atmospheric have been found to be satisfactory, higher or lower pressures can be used, if desired. The pressure of the zinc vaporization system and interrelated reduction reactor system are operated close to atmospheric pressure, but may be operated at higher or lower pressures, if desired.

Among the advantages of the process, it is evident that extraction of impurities with sulfuric acid from silicon tetrahalides in accordance with the invention constitutes a readily utilizable method of eliminating certain impurities from silicon halides, especially silicon tetrachloride, to give a high-purity product with respect to certain impurities. Furthermore, this silicon tetrachloride is not only useful for the production of exceptional quality elemental silicon of transistor grade, but for other uses wherein high-purity silicon tetrachloride is required, as for example, the production of extreme high-purity silica and other compounds of silicon. Furthermore, the purification process of this invention is readily used in combination with other processes for the manufacture of hyperpure silicon which eliminates traces of other contaminating materials from silicon tetrahalide and from the silicon product. When used in conjunction with the high temperature bed for pyrolyzing contaminating compounds, the inorganic acid extraction herein contemplated can be effected either before and/or after the pyrolyzing process, as desired.

This application is a continuation-in-part of my copending application, Serial No. 401,037, filed December 29, 1953, now abandoned.

I claim as my invention:

1. A process for purifying a liquid silicon halide comprising extracting impurities from said halide by commingling the same with an immiscible, inorganic acid selected from the group consisting of liquid sulfuric acid and liquid phosphoric acid, separating the silicon halide and the acid containing the extracted impurities before substantial decomposition of the silicon halide occurs, and recovering the hyperpure silicon halide which results.

2. An improved process for purifying silicon tetrachloride containing minor amounts of impurities comprising liquid-liquid extracting the silicon tetrachloride with concentrated sulfuric acid by commingling the tetrachloride and the acid, separating the silicon tetrachloride and the sulfuric acid containing the extracted impurities before substantial decomposition of the silicon halide occurs, and recovering the hyperpure silicon tetrachloride.

3. A process for purifying silicon tetrachloride comprising extracting impurities from said tetrachloride by commingling the same with an immiscible, inorganic acid selected from the group consisting of liquid sulfuric acid and liquid phosphoric acid, separating the silicon tetrachloride and the acid containing the extracted impurities before substantial decomposition of the silicon halide occurs, and recovering the resulting hyperpure silicon tetrachloride.

4. A process for purifying silicon tetrachloride containing minor amounts of impurities, comprising commingling the same with sulfuric acid by passing said silicon tetrachloride in the gaseous state through liquid sulfuric acid, separating the silicon tetrachloride from the sulfuric acid before substantial decomposition of the silicon tetrachloride occurs and thereafter condensing and recovering the purified silicon tetrachloride product.

5. A process for purifying a silicon halide comprising extracting impurities from said halide by commingling the same with an immiscible, inorganic acid selected from the group consisting of liquid sulfuric acid and liquid phosphoric acid, separating the silicon halide and the acid containing the extracted impurities before substantial decomposition of the silicon halide occurs, and recovering the hyperpure silicon halide which results.

6. A process for purifying a silicon halide comprising extracting impurities from said halide by commingling the same with liquid sulfuric acid of about 80–100% strength, separating the silicon halide from the immiscible acid containing the extracted impurities before substantial decomposition of the silicon halide occurs, and recovering the purified silicon halide which results.

7. A process for purifying a silicon halide comprising extracting impurities from said halide by commingling the same with concentrated liquid phosphoric acid, separating the silicon halide from the immiscible acid containing the extracted impurities before substantial decomposition of the silicon halide occurs, and recovering the purified silicon halide which results.

References Cited in the file of this patent

UNITED STATES PATENTS

| | | |
|---|---|---|
| 1,241,796 | Weaver | Oct. 2, 1917 |
| 2,469,418 | Striplin | May 10, 1949 |

FOREIGN PATENTS

| | | |
|---|---|---|
| 656,098 | Great Britain | Aug. 15, 1951 |

OTHER REFERENCES

Lyon et al.: "J. of Electrochemical Society," vol. 96, No. 6, December 1949, pages 359–363.

Mellor: "Comprehensive Treatise on Inorganic and Theoretical Chemistry," vol. 6, page 965.